United States Patent [19]

Hirschsohn et al.

[11] 4,122,832
[45] Oct. 31, 1978

[54] SOLAR COLLECTOR

[76] Inventors: Ladislav Hirschsohn, 30 Ben Ami St., Acre; Ephraim Hirschsohn, 61 Hashoftim St., Kiryat Motzkin, both of Israel

[21] Appl. No.: 793,546

[22] Filed: May 4, 1977

[30] Foreign Application Priority Data

May 14, 1976 [IL] Israel ...................................... 49575

[51] Int. Cl.² ............................................. F24J 3/02
[52] U.S. Cl. .................................................. 126/271
[58] Field of Search ................................. 126/270, 271

[56] References Cited

U.S. PATENT DOCUMENTS

| | | | |
|---|---|---|---|
| 3,847,136 | 11/1974 | Salvail | 126/271 |
| 3,985,117 | 10/1976 | Sallen | 126/271 |
| 4,011,856 | 3/1977 | Gallagher | 126/271 |
| 4,022,188 | 5/1977 | Cohen et al. | 126/271 |
| 4,051,834 | 10/1977 | Fletcher et al. | 126/271 |

Primary Examiner—Carroll B. Dority
Attorney, Agent, or Firm—Benjamin J. Barish

[57] ABSTRACT

A solar collector is described comprising an extrusion, preferably of cellular plastics material, having a longitudinally extending recess and a metal absorber sheet thereover, a tube disposed within the recess in contact with the metal absorber sheet, and a transparent window. The extrusion recess is of semi-circular cross-section, and the tube is of circular cross-section and has an outer diameter substantially equal to that of the recess. In some described embodiments, the window is received on flanges formed at the edges of the extrusion; and in other described embodiments, it is integrally formed with the plastics extrusion.

9 Claims, 6 Drawing Figures

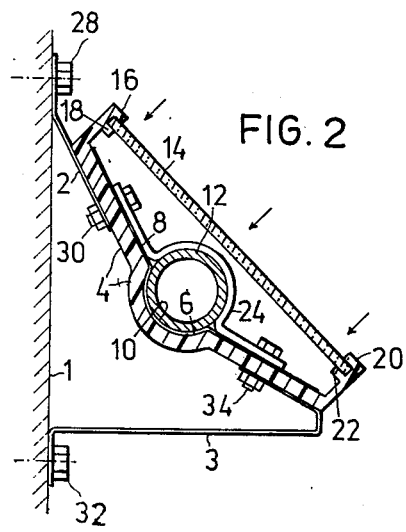
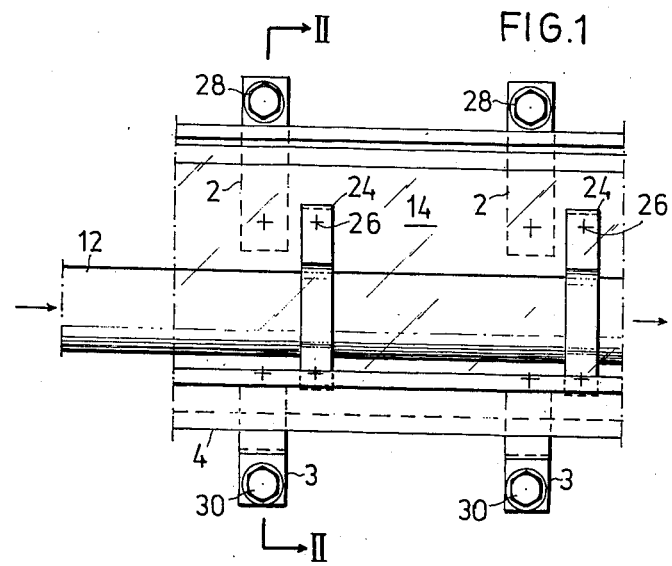
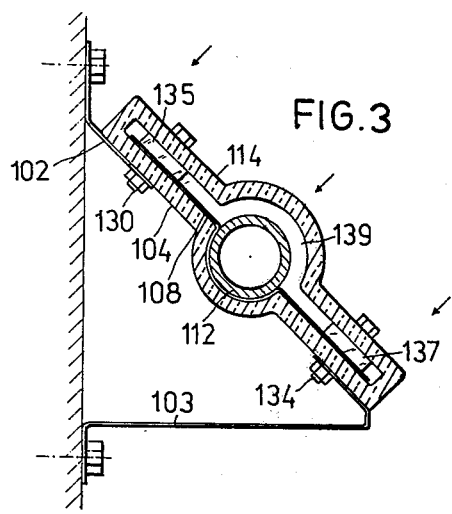
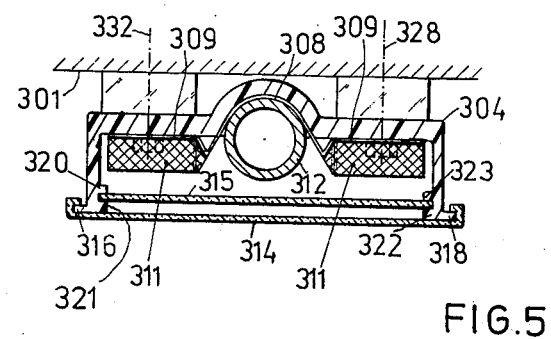
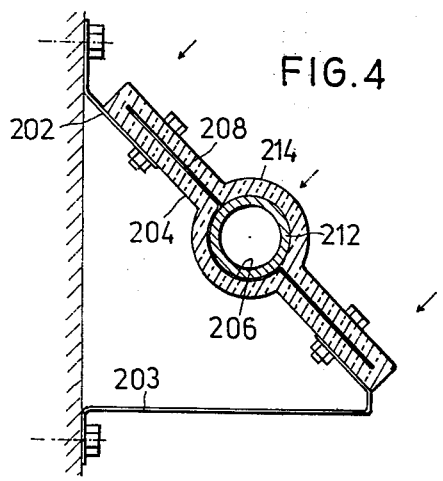
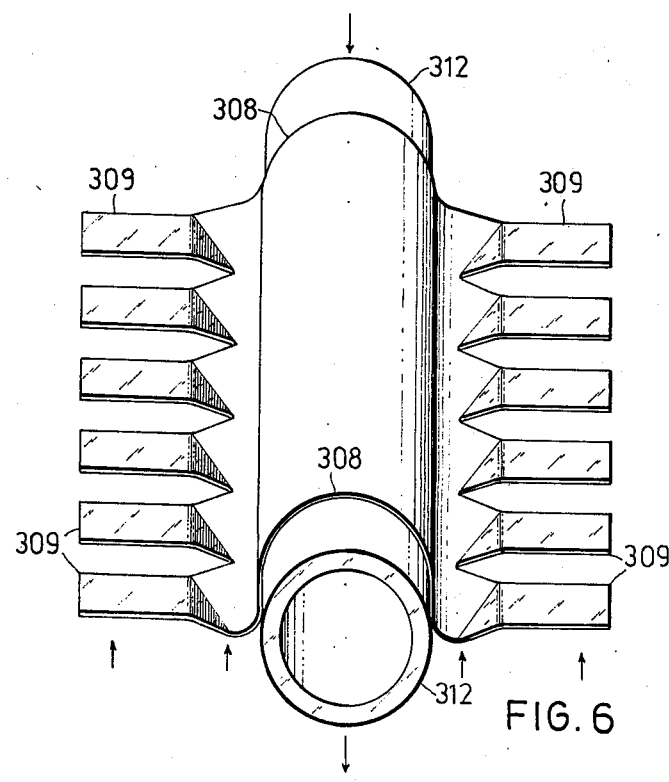

SOLAR COLLECTOR

BACKGROUND OF THE INVENTION

The present invention relates to solar collectors, and particularly to solar collectors for heating a liquid, such as water, by solar radiations.

A number of different types of solar collectors are now in use. As a rule, the known collectors includes many parts which are relatively costly to produce, and/or to assemble, and therefore are not susceptible for low-cost, mass-production. In addition, the known collectors commonly include bent and/or small diameter fluid (e.g. water) pipes which are difficult to clean.

An object of the present invention is to provide new forms of solar collectors having advantages in the above respects.

BRIEF SUMMARY OF THE INVENTION

According to a broad aspect of the present invention, there is provided a solar collector for heating a liquid by solar radiations, comprising: an extrusion having at least one straight longitudinally-extending recess formed therein and closed by a transparent window, and a straight tube disposed within the longitudinally-extending recess for the liquid to be heated by the solar radiations. The extrusion is of semi-circular cross-section, and the tube is of circular cross-section and has an outer diameter substantially equal to that of the recess.

In the preferred embodiment of the invention described below, the extrusion is of plastics material, and the tube is of metal, the collector further including a metal absorber having a solar radiation-absorbing surface facing the window, the metal absorber including a longitudinally-recessed portion underlying and in contact with the metal tube.

Preferably, the plastics material of the extrusion is of cellular construction.

Several embodiments of the invention are described below. In some described embodiments, the extrusion is integrally formed with a pair of spaced, inwardly-directed flanges along each of its two longitudinal edges, the edges of the window being received within these flanges. In other described embodiments, the transparent window is formed integrally with and constitutes a part of the longitudinally-extending extrusion.

In a further described embodiment, the metal absorber is constituted of a blackened metal sheet having a plurality of vanes formed at an angle to the planes of the longitudinal and transverse axes of the extrusion to permit the absorber to intercept solar radiations when the collector is mounted in a vertical position.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a front elevational view illustrating one form of solar collector constructed in accordance with the invention;

FIG. 2 is a transverse, vertical sectional view along lines II—II of the solar collector of FIG. 1;

FIGS. 3 and 4 are corresponding sectional views illustrating two further solar collectors constructed in accordance with the invention;

FIG. 5 is a transverse horizontal sectional view (from above) of a further form of solar collector constructed in accordance with the invention; and FIG. 6 is a three-dimensional view illustrating the construction of the absorber member, and the fluid-carrying tube in the solar collector of FIG. 5.

DESCRIPTION OF THE PREFERRED EMBODIMENTS

The solar collector illustrated in FIGS. 1 and 2 is mounted to a vertical support 1 by a plurality of pairs of brackets 2, 3, spaced along its length. The collector includes a straight longitudinally-extending extrusion 4 formed with a central longitudinally-extending recess 6 of semi-circular cross-section. Disposed on the inner surface of extrusion 4 is a metal absorber 8 constituted of a metal sheet, such as aluminum or copper, blackened on its upper face for absorbing the solar radiations. The central portion of absorber 8 is also formed with a longitudinally-extending recess 10 received within recess 6 of extrusion 4. A tube 12 having a circular cross-section of an outer diameter substantially equal to that of the recess 10, is received within recess 10 and in contact with the absorber 8. Tube 12 is also of metal, such as copper, aluminum or iron, and serves as a conduit for the fluid (e.g. water) to be heated by the solar radiations. The upper end of extrusion 4 is closed by a transparent window panel 14, such as of glass or plastic. For this purpose, the extrusion 4 is integrally formed with a pair of spaced, inwardly-directed flanges, namely flanges 16, 18, along its one side, and flanges 20, 22 along its opposite side, for receiving the edges of the transparent window 14 by a snap-fit.

Extrusion 4 is made of plastics material, preferably one having a cellular construction, such as cellular polyvinyl chloride. A plurality of clamps or straps 24, of metal, preferably of the same blackened metal as the absorber 8, are applied transversely across tube 12 and are attached to the extrusion 4 by bolts 26 (FIG. 1) passing through absorber 8 and the extrusion 4. The collector may be mounted to vertical support 1 by means of bolts 28, 30 attached to the upper bracket 2, and bolts 32, 34, attached to the lower bracket 3. Any desired number of such brackets 2, 3, could be used for mounting the collector, depending on its length.

It will be appreciated that the solar collector illustrated in FIGS. 1 and 2 may be assembled and produced at low cost on a mass-production basis. Thus, the extrusion 4, constitutes the main part of the housing, the support for the absorber 8 and the water-conducting tube 12, and the lower insulation for the latter tube. Extrusion 4 can be produced in continuous form at low cost and into the desired sizes. The water conducting tube 12 may be of a continuous length of a straight, relatively large diameter tube, according to the desired size and capacity of the collector; it can thus be easily cleaned by merely drawing a brush through it. It will also be seen that the collector can be easily assembled and disassembled for repair or maintenance purposes.

FIG. 3 illustrates a variation wherein the extrusion, 104, is integrally formed as one unit with the transparent window 114. Thus, both may be produced in a single extrusion process by using transparent plastics material. The absorber 108 and the water-conducting tube 112 may both be disposed between the extrusion member 104 and the window 114, and the unit may be attached to its mounting brackets 102, 103, by bolts 130, 134. The collector preferably includes spacer elements 135, 137 between the absorber 108 and the window 14, to produce an air chamber 139 between the window, and the absorber 108 and water tube 112.

FIG. 4 illustrates a still further variation, similar to that of FIG. 3, except that no air chamber (139) is provided. Thus, the extrusion 204 is integrally formed as one unit with the transparent window 214 around the absorber 208 and water tube 212, the latter being disposed within recess 206 in the absorber. This can be effected by extruding members 204 and 214 over and in contact with absorber 208 and tube 212, to produce an integrated unit which can be cut to size and mounted by brackets 202, 203. Alternatively, members 204 and 208 may be extruded as a single unit and then shrunk-fit around tube 212 and absorber 208.

FIGS. 5 and 6 illustrate a still further variation, particularly in the construction of the metal absorber, to enable the collector to be mounted in a vertical position. Thus, as particularly shown in FIG. 6, the metal absorber 308, having an insulating layer 311 on its rear face, is formed with a plurality of vanes 309 oriented at an angle to the planes of the longitudinal and transverse axes of the water tube 312 and of the extrusion 304 (FIG. 5).

FIG. 5, which is a horizontal section viewed from above, illustrates the solar collector mounted to a vertical support 301 by means of mounting bolts 328, 332. It will be seen that when so mounted the vanes 309, being at an angle to both the planes of the longitudinal and transverse axes of the extrusion 304 and water tube 312, will intercept the solar radiations so as to convert the energy to heat for heating the water within the water tube 312.

FIG. 5 also illustrates a further variation of providing two spaced windows, namely windows 314 and 315. Window 314 is snap-fitted over outwardly-directed flanges 316, 318 formed at the ends of the extrusion 304; and window 315 is snap-fitted between a pair of inwardly-directed flanges 320, 321, on one side of the extrusion 304, and another pair of inwardly-directed flanges 322, 323, on the other side of the extrusion.

Many other variations, modifications and applications of the illustrated embodiments will be apparent.

What is claimed is:

1. A solar collector for heating a liquid by solar radiations, comprising: an extrusion having at least one straight longitudinally-extending recess formed therein of semi-circular cross-section; a straight tube disposed within the longitudinally-extending recess for the liquid to be heated by the solar radiations; said tube being of circular cross-section and having an outer diameter substantially equal to the diameter of the semi-circular recess; and a transparent window overlying the extrusion and the straight tube disposed within its recess, said extrusion being of plastics material, and the tube being of metal, the collector further including a metal absorber having a solar-radiation-absorbing surface facing said window, the metal absorber including a longitudinally-recessed portion underlying and in contact with the metal tube.

2. A collector according to claim 1, wherein the plastics material of the extrusion is of cellular construction.

3. A collector according to claim 1, wherein said extrusion is integrally formed with a pair of spaced, inwardly-directed flanges along each of its two longitudinal edges, the edges of said window being received within said flanges.

4. A collector according to claim 1, further including clamps extending transversely across the tube and clamping same to the extrusion.

5. A collector according to claim 1, wherein the two opposite sides of the extrusion outwardly of its longitudinally-extending recess are formed at an obtuse angle to each other.

6. A collector according to claim 1, wherein the transparent window is formed integrally with and constitutes a part of the longitudinally-extending extrusion.

7. A solar collector according to claim 6, wherein the transparent window also includes a longitudinally-extending recessed portion which portion is spaced from the tube to produce an air chamber there between.

8. A solar collector according to claim 6, wherein the transparent window includes a longitudinally-extending recessed portion aligned with the recessed portion of the metal absorber, said tube being disposed between and in contact with said recessed portions of the metal absorber and window.

9. A collector according to claim 1, wherein the metal absorber is constituted of a blackened metal sheet having a plurality of vanes formed at an angle to the planes of the longitudinal and transverse axes of the extrusion to permit the absorber to intercept solar radiations when the collector is mounted in a vertical position.

* * * * *